United States Patent Office 3,075,948
Patented Jan. 29, 1963

3,075,948
METHOD FOR PREPARING GRAFT COPOLYMERS OF POLYOLEFIN AND SILANES AND A GRAFT COPOLYMER THEREOF
Thomas R. Santelli, Toledo, Ohio, assignor to Owens-Illinois Glass Company, a corporation of Ohio
No Drawing. Filed Oct. 23, 1959, Ser. No. 848,221
11 Claims. (Cl. 260—45.5)

This invention relates to graft polymers of an unsaturated silane monomer with normally solid polymers of alpha-olefins containing 2 to 6 carbon atoms, and to methods for their preparation.

It is an object of this invention to provide graft polymers of alpha-olefin polymers with unsaturated silanes having increased heat resistance and good adhesion to glass. It is also an object of the invention to provide a method for preparation of such polymers.

Other objects as well as advantages of the invention will become apparent from a consideration of the following detailed description.

In accordance with the invention there is provided a method which comprises the reaction of a normally solid polymer of an alpha-olefin having 2 to 6 carbon atoms per molecule with an unsaturated silane compound of the formula $$R_nSiL_{(4-n)}$$

where R is a monovalent hydrocarbon radical containing ethylenic unsaturation, n is an integer from 1 to 2, and each L is selected from the group consisting of H, —OR''', or X, where each L is the same or different, where R''' is a hydrocarbon radical containing no unsaturation other than aromatic ring carbon to carbon unsaturation, and where X is halogen (Cl, F, I or Br). Usually X is Cl because of the relative availability and cost of compounds containing chlorine as the halogen.

The hydrocarbon radical R is usually an alkenyl, a cycloalkenyl, an aralkenyl, a cycloalkylalkenyl or an alkylcycloalkenyl radical or a radical R'—R''—, where R'' is an aryene, an alkarylene, a cycloalkylene or an alkylcycloalkylene radical, and R' is an alkenyl radical attached directy to the cyclic radical.

The hydrocarbon radical R''' is usually selected from the group consisting of an alkyl, an aryl, a cycloalkyl, an aralkyl, an alkaryl, a cycloalkylalkyl and an alkylcycloalkyl radical.

The radical R usually contains from 2 to 12 atoms per molecule while R''' usually contains from 1 to 12 carbon atoms per molecule.

The now preferred unsaturated silane compound reactants of the invention are those containing from 2 to 30 total carbon atoms.

One especially useful group of reactants of the formula $$R_nSiL_{(4-n)}$$

are the alkenyl alkoxy silanes where n is 1, R is an alkenyl radical having from 2 to 6 carbon atoms, each L is selected from H and an alkoxy radical having from 1 to 4 carbon atoms, at least one alkoxy being selected, and wherein the total number of carbon atoms in the compound is from 3 to 18.

Some representative examples of the unsaturated silanes applicable in the present process are vinyl silane, vinyltriethoxysilane, vinyldichlorosilane, vinyltrichlorosilane, divinyldichlorosilane, allyl silane, allyldichlorosilane, allyltrichlorosilane diallyldichlorosilane, allyldifluorosilane, vinyldibromosilane, methoxyvinyldichlorosilane, dodecenylvinyldichlorosilane, didecenyldichlorosilane, didodecenyldifluorosilane, cyclohexenyltrichlorosilane, hexenylhexoxydichlorosilane, vinyl-tri-n-butoxysilane, hexenyltri-n-butoxysilane, allyldipentoxysilane, butenyldodecoxysilane, decenyldidecoxysilane, dodecenyldioctoxyfluorosilane, heptenyltriheptoxysilane, allyltripropoxysilane, vinyl-n-butoxydiiodosilane, divinylsilane, diallyldi-n-butoxysilane, pentenyltripropoxysilane, allyldi-n-butoxysilane, vinylethoxysilane, sec.-butenyltriethoxysilane, 5-benzyl-6-(dinonoxysilyl)-1-hexene, 4-phenyl-5-propoxydichlorosilyl)-1-pentene, 2-cyclopentyl-3-silyl-1-propene, 4-cyclohexyl-7-(tertiarybutoxydifluorosilyl)-2-dodecene, o-(trimethoxysilyl) styrene, o-diphenoxysilyl)-p-octylstyrene, o-(benzyloxydichlorosilyl)-o'-methylstyrene, 3-(tolyloxysilyl) vinylcyclohexane, 3-(tolyloxydibromosilyl)-2-phenyl-1-butene, 3-(tripropoxysilyl)-5-methylvinylcyclohexane, 5-cyclohexyl-6-(triethoxysilyl-1-hexene, (methylcyclopentenyl) dichlorosilane.

Alpha-olefins having 2 to 6 carbon atoms include ethylene, propylene, 1-butene; 1-pentene; 1-hexene; isobutylene; 2-methyl-1-butene; 3-methyl-1-butene; 2,2-dimethylpropene; 2-methyl-1-pentene; 3-methyl-1-pentene; 4-methyl-1-pentene; 2,2-dimethyl-1-butene; 2,3-dimethyl-1-butene; 3,3-dimethyl-1-butene; and 2-ethyl-1-butene. The solid olefin polymer reactant employed in the invention is either a homopolymer of an alpha-olefin having 2 to 6 carbon atoms or a copolymer of same.

The invention is especially useful when the solid polymer reactant is a polymer of ethylene or propylene, and a now preferred group of solid polymer reactants includes homopolymers of ethylene, homopolymers of propylene, and copolymers of ethylene and propylene in any proportion; also of special interest are copolymers of ethylene with 1-butene where the ethylene forms the major (over 50 weight percent) constituent of the polymer, and copolymers of propylene with 1-butene where the propylene forms the major constituent of the polymer.

While the invention is applicable to reaction of the solidified polymers of the olefins with the unsaturated silane monomer in the absence of a solvent to obtain surface reaction on solid particles, sheets or other solid forms, the greatly preferred method of the invention is to carry out the reaction in the presence of a solvent that dissolves at least a portion of the polyolefin under the reaction conditions. This process is greatly preferred since it produces a much greater degree of reaction and yields a new and more homogeneous copolymer of greatly improved characteristics rather than merely producing a surface reacted polymer. Such solvents are well known. In the case of solid homopolymers of ethylene, for instance, suitable solvents include xylene, cyclohexane, tetralin, benzene, toluene, naphthalene, cumene, and decalin. Of course, the solvents chosen are inert under the reaction conditions.

Another method of effecting the reaction, although also much less preferred than the solvent method, is to carry out the reaction in the absence of a solvent but employing temperatures such that the solid polymer is melted during reaction with the unsaturated silane.

In the preferred method a catalyst for promotion of addition polymerizaton is usually employed. Especially useful are organic peroxides and organic hydroperoxides soluble in the solvent employed in the polymerization reaction. Other free radical forming catalysts are well known and are also applicable.

Some examples of useful organic peroxide and hydroperoxide catalysts are benzoyl peroxide, tert.-butyl hydroperoxide, 1-hydroperoxy-1-phenylcyclohexane, di(tertiary butyl) peroxide, methyltetrahydrofuran peroxides, aldehyde and ketone peroxides, acetyl peroxide, stearyl peroxide, toluyl peroxide, anisyl peroxide, cumene hydroperoxide, methyl cyclohexyl hydroperoxide, cyclohexyl hydroperoxide, perbenzoic acid, 1-hydroxycyclohexyl hydroperoxide, hydroxy heptyl peroxide, isopropyl (dimethyl) hydroperoxymethane, 1-methyl-1-hydroperoxycyclopentane, tetralin hydroperoxide, octahydrophenanthrene hydroperoxide, dimethyl (isopropylphenyl) hydroperoxymethane, methylethyl (ethoxyphenyl) hydroperoxymethane, methyldecyl(methylphenyl) hydroperoxymethane dimethyldecylhydroperoxymethane, methylchlorophenylphenylhydroperoxymethane, and dimethyl (tertiarybutylphenyl) hydroperoxymethane.

In carrying out the process of the invention, reaction temperatures are generally in the range from 100° C. to 300° C., although higher and lower temperatures are applicable.

The graft copolymer products of the present invention are useful for molding plastic objects, such as containers resistant to high temperatures, etc. The products are also useful for coating glass containers and other objects to shield the glass from physical shock or from abrasion damage.

The following specific examples are merely illustrative and are not to be taken as limiting the invention.

*Example 1*

Twenty grams of high density polyethylene were dispersed in 200 grams of dry xylene in a glass flask and 50 grams of vinyltriethoxysilane and 1 gram of benzoyl peroxide were added. The flask was equipped with a reflux condenser and a heating mantle. The reaction mixture was heated at a temperature of about 135–140° C. under reflux condition for a period of 60 hours. The mixture was permitted to cool and the white powdery polyethylenevinyltriethoxysilane graft copolymer precipitate was separated, washed with acetone to remove solvent and any unreacted vinyltriethoxysilane, and dried.

The softening temperature of the copolymer was not noticeably different than the original unreacted polyethylene, but unlike the polyethylene remained rubbery and tough at 250° C. Analysis showed that the polymer contained 2.24 weight percent silicon.

The foregoing run was repeated except that the monomeric vinyltriethoxysilane was omitted in order to determine whether the benzoyl peroxide had any crosslinking effect. The polymer resulting from this run showed no change in properties.

Tests have shown that the products of the invention are tough, temperature resistant and adherent to glass. For example, the product of the invention in Example 1 having 2.24 weight percent silicon was pressed between glass plates in a press at pressures between 2000 and 8000 p.s.i.g. and at temperatures of about 200° C. for about 10 minutes in each case. Translucent, tenaciously adherent films were formed on the surfaces of the glass plates.

*Example 2*

Fifty grams of high density, linear polyethylene (melting point determined to be 138–140° C. in a block test in the Fischer-Johns melting point apparatus) were dissolved in 700 ml. of dry xylene in a flask, and 50 grams of vinyltriethoxysilane plus 0.5 gram of benzoyl peroxide were added. The flask was equipped with a reflux condenser, stirrer, and a heating mantle. The reaction mixture was heated at a temperature of about 135–140° C. under reflux conditions for 6 hours. During the reaction a precipitate formed and adhered to the flask. After 6 hours heating, the mixture was decanted, leaving the adherent polymer in the reaction flask. The decanted liquid was allowed to cool to about room temperature and further polymer precipitated.

The precipitate was recovered from the reaction mixture, washed with diethyl ether, filtered and dried. This material had a melting point of about 140° C., substantially that of the original polyethylene.

The polyethylene-vinyltriethoxysilane graft polymer adhering to the reaction flask was scraped therefrom, washed with diethyl ether, filtered, and dried. This polyethylene-vinyltriethoxysilane graft polymer had a melting point of about 180° C.

The liquid from the reaction mixture was distilled and only 5 ml. of unreacted vinyltriethoxysilane was contained therein.

*Example 3*

Fifty grams of the same high density polyethylene used in Example 2 were dissolved in 750 ml. of decalin in a flask, and 50 grams of vinyltriethoxysilane plus 0.5 gram of benzoyl peroxide were added. The flask was equipped with a reflux condenser, stirrer and heating mantle. The reaction mixture was heated at a temperature of about 180 to 190° C. under reflux conditions for 5 hours. During this time the mixture turned black and then deep red. During this period of reaction polymer precipitated out and was deposited on the sides of the flask. The mixture was allowed to cool. Some material precipitated. The resultant slurry was removed from the reaction flask, and the material adhering to the reaction flask was scraped therefrom, washed with anhydrous diethyl ether, filtered, and dried. Its melting point by the Fischer-Johns method was found to be 160° C.

The slurry comprising the reaction mixture minus the material scraped from the sides of the flask was returned to the reaction flask, together with 50 additional grams of vinyltriethoxysilane, and this mixture was refluxed for an additional 6 hours. Again a precipitate adhered to the sides of the flask. The reaction mixture was decanted, and the adherent polyethylenevinyltriethoxysilane copolymer material recovered as before. It had a melting point of about 160° C. The decanted mixture was allowed to cool and the precipitated polymer was filtered therefrom. This polymer, after washing and drying, amounted to 26 grams and was found to have a melting point of about 140° C. In other words, it was unchanged polyethylene. Thus, about 14 grams of the original polyethylene was copolymerized. The solvent from the reaction mixture containing the unreacted vinyltriethoxysilane was distilled. It contained 90 grams of unreacted vinyltriethoxysilane. Thus, approximately 10 grams was reacted.

*Example 4*

Another run was carried out according to the procedure set forth in Example 2, except that 90 grams of vinyltriethoxysilane was used, 500 grams of dry xylene was used, and the reaction time was 12 hours. Again the resulting polyethylene-vinyltriethoxysilane graft polymer had a melting point of about 180° C. and the unreacted polyethylene had a melting point of about 140° C.

Films were made of the graft copolymer product and of the unreacted polyethylene by pressing heated samples between sheets of aluminum foil. The graft copolymer product film was much tougher and more rubbery than the film made from the unreacted polyethylene. In addition, it adhered well to the aluminum foil.

*Example 5*

Another run was carried out according to the procedure set forth in Example 2, using 50 grams of polyethylene, 100 grams of vinyltriethoxysilane, 0.5 gram of benzoyl peroxide and 700 ml. of xylene solvent. The reaction time under reflux conditions was about 64 hours. The product polyethylene-vinyltriethoxysilane graft copolymer had a melting point of about 180° C., while the unreacted polyethylene had a melting point of about 140° C. On distillation, only 27 grams of vinyltriethoxysilane was recovered, indicating that about 73 grams had polymerized.

As will be evident to those skilled in the art, various modifications of this invention can be made or followed in the light of the foregoing disclosure and discussion without departing from the spirit or scope of the disclosure or from the scope of the claims.

I claim:

1. A method comprising graft copolymerization of a solid polymer of an alpha monoolefin having 2 to 6 carbon atoms per molecule with an unsaturated silane compound of the formula $$R_nSiL_{(4-n)}$$

where R is a hydrocarbon radical having ethylenic unsaturation and is selected from the group consisting of an alkenyl, a cycloalkenyl, an aralkenyl, a cycloalkylalkenyl, an alkylcycloalkenyl radical and a radical R'—R"—, where R" is selected from the group consisting of an arylene, an alkarylene, a cycloalkylene and an alkylcycloalkylene radical, and R' is an alkenyl radical attched directly to the cyclic radical; $n$ is an integer from 1 to 2; and each L is selected from the group consisting of H, —OR''' and X—, the selection for any particular L radical being independent of the selection for any other particular L radical, where R''' is a member selected from the group consisting of a saturated hydrocarbon radical and a hydrocarbon radical having only an aromatic ring carbon to carbon unsaturation, and X is halogen, said copolymerization being effected by contacting said polymer with said unsaturated silane compound in the presence of a catalyst for promotion of said graft polymerization, and reacting said polymer with said silane compound; said polymer being selected from the group consisting of a homopolymer of an alpha-monoolefin having 2–6 carbon atoms per molecule and a copolymer of an alpha-monoolefin with another alpha monoolefin having 2–6 carbon atoms per molecule.

2. A method of claim 1 wherein said solid polymer is at least partially dissolved in a solvent during said copolymerization.

3. A method of claim 2 wherein said catalyst is an organic peroxide.

4. A method of claim 2 wherein said solid polymer is polyethylene.

5. A method of claim 4 wherein said unsaturated silane is vinyltriethoxysilane.

6. A graft copolymer of a solid polyethylene with vinyltriethoxysilane.

7. A method of claim 2 wherein said catalyst is an organic hydroperoxide.

8. A method of claim 2 wherein said solid polymer is polypropylene.

9. A method of claim 2 wherein said solid polymer is a coplymer of ethylene and propylene.

10. A method of claim 2 wherein said solid polymer is a copolymer of a major proportion of ethylene with 1-butene.

11. A method of claim 2 wherein said solid polymer is a copolymer of a major portion of propylene with 1-butene.

References Cited in the file of this patent

UNITED STATES PATENTS

| | | |
|---|---|---|
| 2,841,569 | Rugg et al. | July 1, 1958 |
| 2,901,458 | Banes et al. | Aug. 25, 1959 |